United States Patent Office 3,713,987
Patented Jan. 30, 1973

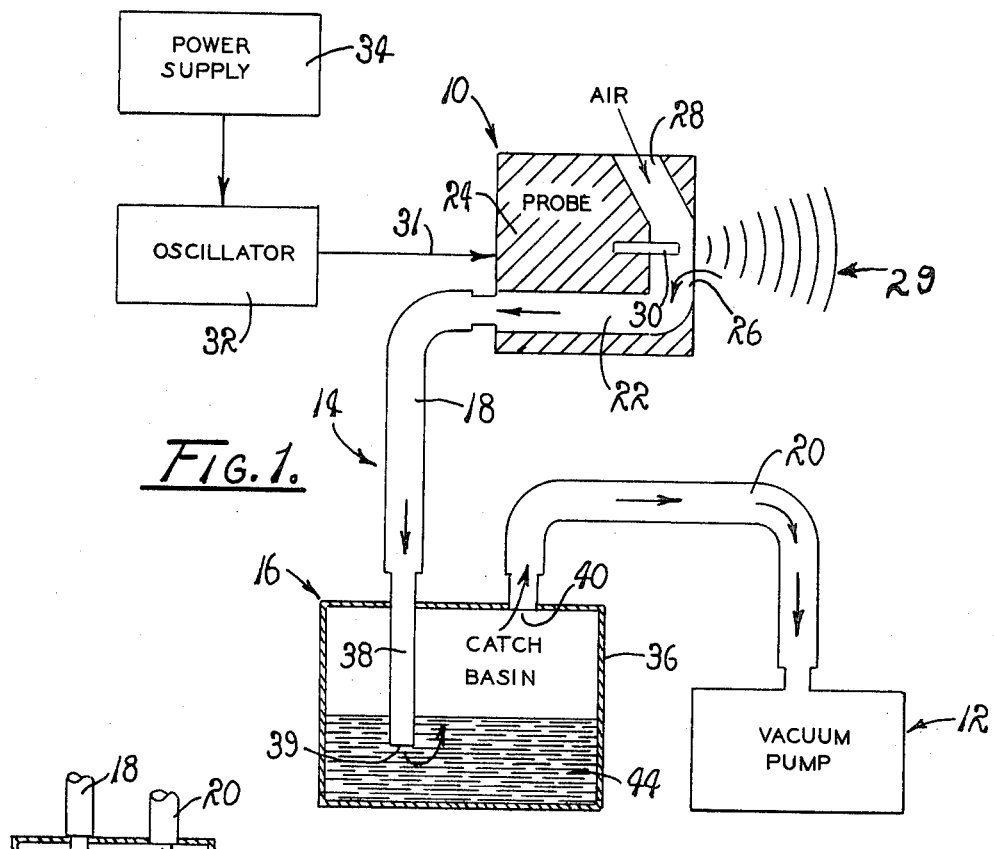
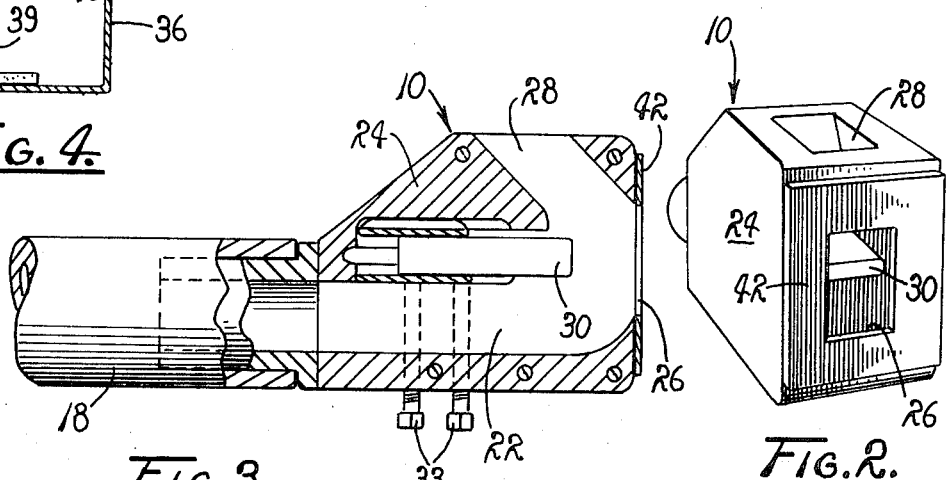

3,713,987
APPARATUS FOR RECOVERING MATTER ADHERED TO A HOST SURFACE
George M. Low, Deputy Administrator of the National Aeronautics and Space Administration, with respect to an invention of William W. Paik, Newport News, Va., and Carl P. Chapman, La Crescenta, Calif.
Filed Oct. 7, 1970, Ser. No. 78,703
Int. Cl. C12k 1/10
U.S. Cl. 195—127                                      3 Claims

ABSTRACT OF THE DISCLOSURE

An apparatus particularly suited for recovering matter adhered to a host surface. The apparatus is characterized by a pickup head having an ultrasonic transducer adapted to deliver ultrasonic pressure waves to impinge against matter adhered to the surface for thus agitating the matter to effect its separation from the surface, and an integrally related vacuum system which serves to recover the separated matter and deliver such matter to a catch basin wherein the matter is entrapped to be recovered for examination and/or disposal.

ORIGIN OF INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

(1) Field of the invention

The invention relates to an apparatus for recovering matter adhered to a host surface, and more particularly to an apparatus which serves to cause adhered matter to be agitated for purposes of achieving a separation of the matter from its host surface, and an integrally related vacuum system for developing a vacuum adjacent to the host surface for removing the matter once its separation has been achieved.

(2) Description of the prior art

The prior art includes various types of apparatus and systems employable in removing matter from various environments. For example, it is common pratice to brush, scour, and vacuum surfaces for purposes of removing foreign matter. Also, abrasive streams of fluid, both air and water, and solvent baths often are employed in removing foreign matter from given surfaces.

When sterilizing or removing foreign matter found on certain surfaces, such as the external surfaces of a spacecraft, it is imperative that the matter be removed without damaging the host surfaces. Additionally, when removed matter is to be examined and analyzed, it must be entrapped in a manner consistent with such purposes. One technique commonly employed in sterilizing spacecraft involves "washing" the surfaces with selected solvents and then recovering from the "spent" solvent matter removed during washing, preparatory to the examination and/or disposal of the recovered matter. However, for reasons which should readily be apparent, certain instrumentation, particularly that found aboard spacecraft, simply cannot withstand the rigorous effects of chemical solutions or solvents commonly employed in sterilization. Hence, the use of solvents is severely impeded.

As a practical matter, apparatus of a type which employ vacuum systems have not provided totally satisfactory solutions to the problems commonly encountered in sterilizing surfaces and examining recovered microscopic materials. This is particularly true where the matter is the external surfaces of spacecraft and the like. This results, in part, from a persistent lack of practical devices capable of causing microorganisms and other microscopic material to separate and become disassociated from its host surfaces.

The difficulties commonly encountered in removing and recovering matter from host surfaces, of course, are in no way unique to the fields of sterilization of spacecraft, since similar problems plague those involved in sterilizing surfaces employed in "clean rooms," hospitals, and the like, as well as those involved in the recovery and examination of microscopic matter for criminological and industrial purposes.

Accordingly, there currently exists a need for a practical apparatus which readily can be utilized in removing and recovering from host surfaces various types of matter, including viable microorganisms and microscopic particles which often adhere to surfaces incapable of withstanding the rigorous deleterious effects of abrasion, impact and chemical solutions of the type commonly employed in solvents, and the like.

OBJECTS AND SUMMARY OF THE INVENTION

Accordingly, it is an object of the instant invention to provide an improved apparatus for recovering matter adhered to host surfaces.

It is another object to provide an improved apparatus for removing microscopic particles and microorganisms from host surfaces of spacecraft.

It is another object to provide an improved apparatus which employs an ultrasonic transducer for purposes of vibrating matter adhered to host surfaces for causing the matter to become separated from the surfaces.

Another object is to provide an apparatus employing an ultrasonic transducer within a vacuum system to provide an apparatus for removing microorganisms and microscopic matter from delicate surfaces.

Another object is to provide an apparatus including an integrally related ultrasonic transducer and a vacuum collector for purposes of removing microorganisms and particulate matter adhered to host surfaces of the type commonly found aboard spacecraft and the like.

Another object is to provide a unique apparatus capable of removing microorganisms and microscopic matter from delicate host surfaces, employing ultrasonic pressure waves and a vacuum, and delivering the microorganisms and microscopic matter to a catch basin wherein the delivered microorganisms and microscopic matter are retained for purposes of conducting examination, experimentation and growth.

These and other objects and advantages are achieved by providing within a pickup head coupled with a vacuum system an ultrasonic transducer so directed as to agitate and thus effect separation of matter adhered to a host surface, and, subsequently, deliver the matter thus separated to a catch basin for purposes of entrapping the matter within a selected medium, whereby recovery is rendered complete.

BRIEF DESCRIPTION OF THE DRAWING

FIG. 1 is a schematic view depicting an apparatus which embodies the principles of the instant invention.

FIG. 2 is a perspective view of the pickup head employed by the apparatus illustrated in FIG. 1.

FIG. 3 is a partially sectioned view of the pickup head illustrated in FIG. 2.

FIG. 4 is a modified form of the catch basin illustrated in FIG. 1.

DESCRIPTION OF THE PREFERRED EMBODIMENT

Referring now to the drawings wherein like reference characters designate like or corresponding parts throughout the several views, there is shown in FIG. 1 an apparatus which embodies the principles of the instant invention.

The apparatus includes a pickup head 10 operatively coupled with a vacuum pump 12 through a segmented vacuum conduit 14. The vacuum conduit 14 includes a catch basin 16 interconnected with the pickup head 10, through a first conduit segment 18, and the vacuum pump 12, through a second conduit segment 20. Where preferred, the conduit 14 is fabricated employing flexible tubing materials.

As a practical matter, the pickup head 10 includes a body, of a simplified, sandwiched configuration, fabricated from any suitable machinable stock material. As best illustrated in FIG. 3, the conduit segment 18 is coupled with a vacuum chamber 22 drilled or otherwise established within the head 10. The body 24 also is machined, drilled, or otherwise operated upon to provide a recovery orifice 26 through which matter is delievered to the head 10 from an adjacent host surface. In addition to the recovery orifice 26, the head 10 also is provided with an air inlet orifice 28 through which air is introduced, responsive to an establishment of a vacuum or a low pressure condition within the vacuum chamber 22 as a stream of air is delievered through the conduit 14 to the vacuum pump 12.

Within the vacuum chamber 22 there is provided a transducer which functions to propagate ultrasonic pressure waves 29 through the recovery orifice 26 for causing the propagated waves to impinge against and thus agitate matter disposed adjacent the recovery orifice. Where the matter is adhered to a host surface, it is desirable to agitate the matter with a vigor sufficient to cause the matter to be released by the surface, regardless of the state of viability of matter. Hence, the frequency of the transducer preferably is variable.

In practice, a piezoelectric crystal 30, electrically coupled through leads 31 with a suitable power oscillator circuit 32, serves quite satisfactorily as a transducer and is particularly suited to be mounted within the head 10. In such instances, the crystal 30 is mounted within the pickup head through a plurality of screw-threaded mounting pins 33 associated with the crystal in any suitable manner. The oscillator circuit 32 is of any convenient design and is adapted to drive the crystal 30 at a variable frequency, and in a well known manner, for establishing ultrasonic pressure waves which are directed through the orifice 26. A suitable power supply 34, of a type commonly employed with such circuits, is employed in supplying power to the circuit 32. As the specific transducer employed forms no specific part of the instant invention and in view of the fact that such devices are well known and commercially available, a detailed description of the transducer is omitted in the interest of brevity.

However, as should be understood, as the crystal 30 is energized, in response to an energization of the oscillator circuit 32, the resulting ultrasonic pressure waves 29 are delivered through the recovery orifice 26 and are caused to impinge against an adjacent surface, not shown, for thereby agitating and causing matter, including particulate matter and microorgnisms, attached to the host surface to vibrate and thus separate from the host surface. Consequently, as the vacuum pump 12 is activated, for thereby establishing a vacuum within the vacuum chamber 22, the thus separated matter is drawn into the vacuum chamber 22 and thence through the conduit segment 18 ultimately to be deposited in the catch basin 16.

It is to be understood that the catch basin 16 includes an hermetically sealed tank 36 having a suitable, sealable opening formed therein configured to sealingly receive a terminal portion 38 of the conduit segment 18. The terminal portion 38 is provided with a terminal orifice 39 positioned above the lowermost surface or floor of the tank 36. The vacuum pump 12 also communicates with the interior of the tank 36, through the conduit segment 20 and an opening 40, formed within the tank 36 at a location well above the floor of the tank 36. Consequently, as a vacuum is established within the vacuum chamber 22 it also is established within the interior of the hermetically sealed tank 36. Hence, it can be appreciated that any vacuum established within the chamber 22 must be drawn through the tank 36 of the catch basin 16.

As a practical matter, about the recovery orifice 26 there is provided a bumper-pad 42, which includes therein an opening formed congruent with the recovery orifice 26. The bumper-pad 42 preferably is formed of a suitable resilient material, such as that commercially available under the trade name Teflon. It is intended that the bumper-pad 42 act as a cushion between the surface of the pickup head 10 and the host surface being subjected to the effects of the head in order to preclude damaging the host surface as the head 10 is moved therealong for purposes of removing matter from the host surface.

In order for the catch basin 16 to function in its intended manner, it is provided with a suitable medium disposed therewithin for purposes of entrapping matter removed from the host surface and delivered to the catch basin 16, via the vacuum chamber 22 and the conduit segment 18. As illustrated, a body 44 of fluid is deposited within the tank 36 in a quantity sufficient to cause the terminal orifice 39 of the terminal portion 38 of the conduit segment 18 to be inundated so that air and matter extracted through the recovery orifice 26 and the air inlet orifice 28 are caused to pass through the body 44. Hence, matter borne by the stream of air, as it flows from the vacuum chamber 22 through the conduit segment 18, is caused to be deposited within the body of liquid.

The nature of the liquid of the body 44 is dictated by the nature of the particles to be entrapped. For example, where particulate matter being recovered has an affinity for water, the liquid preferably is water. Of course, the viscosity of the liquid should be such as to prevent an escape of matter delivered thereto. Also, it is important to understand that it may be preferred to employ the body 44 as a culture, whereby living microorganisms delivered thereto are afforded an opportunity to multiply for purposes of examination and subsequent study. Additionally, it is to be understood that in lieu of the body 44, the material employed within the tank 36 may be provided as a body 46, FIG. 4, of solid, or semi-solid, material which also functions as a culture medium. In such instances, the body 46 is disposed beneath the level of the terminal orifice 39 so as to accommodate an impaction and embedding of the matter being extracted from the host surface and delivered to the basin 16. Additionally, the body 46 may be formed from a tacky substance which permits the impacted matter to adhere thereto.

In any event, it is to be understood that the body 44 of liquid acts as a trap for entrapping materials separated and extracted from a host surface and delivered to the basin 16 via the conduit segment 18. Of course where the body 46 is employed a similar function is performed thereby. Where desired, the bodies 44 and 46 can be formed of materials toxic to the recovered matter.

Where the bodies 44 and 46 are employed as a culture medium, the material extracted from a host surface is afforded an opportunity to grow and multiply so that a study of matter is facilitated. Additionally, non-viable particles can be analyzed employing any standard technique or device, such as a common microscope, for purposes of detecting particle size, distribution, nature of material and other characteristics of any particular interest which are capable of being detected in such a manner.

OPERATION

It is believed that in view of the foregoing description, the operation of the device will be readily understood and it will be briefly reviewed at this point.

When utilizing the apparatus which embodies the principles of the instant invention, a transducer is mounted withint he head 10, while the vacuum chamber 22 of the head pneumatically is coupled with the catch basin 16 through a conduit segment 18. Where desired, this segment of the conduit 14 is a flexible segment which accommodates positioning of the head 10. The vacuum pump 12 also is coupled with the catch basin 16, through the conduit segment 20. With the device thus assembled, the transducer is energized and rendered effective for propagating ultrasonic pressure waves through the recovery orifice 26, concurrently with an energization of the vacuum pump 12. The head 10 then is advanced along the host surface in incremental steps consistent with the surface area of the recovery orifice 26 so that matter adhering to the host surface is caused to vibrate, and thus agitate, as the pressure waves impinge thereupon for purposes of effecting a separation of the matter from the host surface.

As the matter is separated from the host surface, in response to an impingement of the ultrasonic pressure waves, a flowing stream of air is established through the air inlet orifice 28 and caused to pass through the vacuum chamber 22, while acquiring the matter separated in response to impinging ultrasonic pressure waves. The separated matter thus is swept from the recovery orifice 26 and carried along the conduit segment 18, as the stream of air is caused to extend from the orifice 28 to the vacuum pump 12. As the stream passes through the catch basin 16, the matter borne thereby is deposited in the body 44 of liquid, or, where desired, caused to impact on the body 46 of solid or semi-solid material disposed beneath the terminal orifice 39 of the terminal portion 38. In the latter instance, it has been found preferable to permit the material to embed in the body 46. Of course, the body 46 may be tacky for causing the matter to adhere thereto.

Once matter is recovered from a host surface the tank 36 is opened, through any suitable means, so that access is afforded to the matter removed from the host surface and entrapped therewithin. The matter thus recovered then is treated in a manner consistent with the intended purposes of the use of the head 10.

In view of the foregoing, it should readily be apparent that the apparatus which embodies the principles of the instant invention is a practical apparatus which has utility in effectively cleaning host surfaces, without subjecting the surfaces to deleterious effects of impact, abrasion, or chemical solutions.

Although the invention has been herein shown and described in what is conceived to be the most practical and preferred embodiment, it is recognized that departures may be made therefrom within the scope of the invention, which is not to be limited to the illustrative details disclosed.

What is claimed is:

1. An apparatus for recovering matter adhered to a host surface comprising:
    (A) a pickup head including means defining therein a recovery orifice adapted to be positioned adjacent to said host surface;
    (B) a transducer associated with said pickup head for directing a series of ultrasonic pressure waves to impinge against said matter for thus agitating the matter, whereby the matter is caused to be separated from said surface;
    (C) fluid delivery means including an inlet orifice for delivering a stream of fluid consisting essentially of ambient atmospheric air through said pickup head and along said surface for collecting and transporting separated matter away from the host surface;
    (D) means defining within said pickup head a vacuum chamber;
    (E) a vacuum pump; and
    (F) a vacuum conduit extended between said vacuum pump and said vacuum chamber for conducting said stream of fluid from said pickup head to said pump, including a catch basin coupled within the conduit between said head and said pump, and a body of liquid confined within said basin through which said stream of fluid is bubbled for entrapping separated matter as the stream of fluid is conducted to said pump.

2. The apparatus of claim 1 wherein said body of liquid comprises a toxic material adapted to destroy selected microorganisms as they are entrapped in said liquid.

3. The apparatus of claim 1 wherein said body of liquid comprises a culture medium for propagating selected microorganisms.

References Cited

UNITED STATES PATENTS

| | | | |
|---|---|---|---|
| 3,154,890 | 11/1964 | Lemelson | 259—DIG. 44 |
| 2,932,054 | 4/1960 | Lichtgarn | 15—363 |
| 3,551,295 | 12/1970 | Dyer | 195—100 |

ALVIN E. TANENHOLTZ, Primary Examiner

R. M. ELLIOTT, Assistant Examiner

U.S. Cl. X.R.

15—404, 415; 51—59 SS; 134—1, 184